United States Patent [19]

Klier et al.

[11] Patent Number: 5,611,976
[45] Date of Patent: Mar. 18, 1997

[54] PROCESS FOR THE PRODUCTION OF MOLDINGS FROM TWO-COMPONENT REACTIVE SYSTEMS HAVING A HIGH FILLER CONTENT

[75] Inventors: Lothar Klier, Langenfeld; Thomas Gross, Wermelskirchen; Karl-Dieter Kreuer, Leverkusen; Achim Symannek, Leichlingen, all of Germany

[73] Assignee: Bayer Aktiengesellschaft, Leverkusen, Germany

[21] Appl. No.: 447,306

[22] Filed: May 22, 1995

[30] Foreign Application Priority Data

May 27, 1994 [DE] Germany .................. 44 18 506.5

[51] Int. Cl.$^6$ .................................................. B29C 35/02
[52] U.S. Cl. ............................. 264/45.3; 264/331.19
[58] Field of Search ...................... 264/45.3, 109, 264/331.19, 328.18

[56] References Cited

U.S. PATENT DOCUMENTS

| | | | |
|---|---|---|---|
| 3,114,722 | 12/1963 | Einhorn et al. | 521/54 |
| 3,549,472 | 12/1970 | King et al. | 161/87 |
| 3,621,000 | 11/1971 | Schmelzer et al. | 528/45 |
| 4,107,100 | 8/1978 | Peterhans et al. | 521/137 |
| 4,263,408 | 4/1981 | Meyborg et al. | 521/51 |
| 4,315,996 | 2/1982 | Baatz et al. | 521/54 |
| 4,367,259 | 1/1983 | Fulmer et al. | 428/240 |
| 4,418,160 | 11/1983 | Rasshofer et al. | 521/159 |
| 4,447,373 | 5/1984 | Chappell et al. | 264/4 |
| 4,670,068 | 6/1987 | Chi | 149/19.4 |
| 4,882,112 | 11/1989 | Maki et al. | 264/109 |
| 5,096,623 | 3/1992 | Ward et al. | 521/54 |
| 5,290,818 | 3/1994 | Nafziger et al. | 521/54 |
| 5,451,376 | 9/1995 | Proksa et al. | 422/131 |

FOREIGN PATENT DOCUMENTS

| | | |
|---|---|---|
| 1295213 | 12/1962 | France . |
| 4132878 | 4/1992 | Germany . |

OTHER PUBLICATIONS

Database WPI Section CH, Wk 8226 Class A, An 82–53120E(26) & JP–A–57 080 032 (Okazaki Urethane K.O.), May 19, 1982.

Patent Abstracts of Japan, vol. 10, No. 10 208 (C–361), Jul. 22, 1986, & JP–A–61 047763, (Matsushita Electric Ind. Co.) Mar. 8, 1986.

Kunststoffe, Bd. 81, Nr. 10, Oct. 1991 München, DE, pp. 628–633, Dipl.–ing. Hans Michael Sulzbach 'Schüttgut in Pur–Reaktionsgeissprozessen Verarbeiten'.

Patent Abstracts of Japan, vol. 6, No. 94 (C–105) & JP–A–57 023637 (Inque MTP Co. Ltd.), Feb. 6, 1982.

*Primary Examiner*—Allan R. Kuhns
*Attorney, Agent, or Firm*—Joseph C. Gil; Noland J. Cheung

[57] ABSTRACT

A process is described for the production of optionally cellular polyurethane moldings with an elevated ground material/filler content, which process broadly comprises a) mixing and reacting an aromatic di- or polyisocyanate with a di- and/or polyol of a molecular weight of 1,000 to 20,000 in a quantity insufficient to react with all the NCO groups to yield an isocyanate pre-adduct with an NCO group content of 5 to 32%, b) mixing this isocyanate pre-adduct with ground material/filler, c) mixing the resultant mixture, with a di- and/or polyol with a molecular weight of 62 to 2,000 (crosslinking agent), and optionally water and/or an organic blowing agent, in a static mixer and d) introducing the resultant mixture into a mold.

3 Claims, 2 Drawing Sheets

PROCESS FOR THE PRODUCTION OF MOLDINGS FROM TWO-COMPONENT REACTIVE SYSTEMS HAVING A HIGH FILLER CONTENT

BACKGROUND OF THE INVENTION

The present invention relates to the production of molded products, wherein a mixture which flows under pressure comprising a pulverulent ground material and a reactive two-component binder, in particular a polyurethane binder, is introduced into molds, and reacted therein to form the molded product. It is preferred that recycled plastic material be used as the pulverulent ground material (and, in particular, ground polyurethane foam waste, used components made from polyurethane composite materials, in particular without prior separation of the various composite materials), optionally in combination with inorganic fillers.

The present invention relates in particular to two-component polyurethane binder systems. However, the present invention may also be used with other two-component binder systems.

It has already been proposed in French patent 1,295,213 and U.S. Pat. No. 3,549,472 to reuse ground or comminuted polyurethane foam with a reactive polyurethane mixture as the binder. However, conventional methods for the production of the binder/ground material mixture lead to disruptive polymer formation in the mixing and conveying units. The necessary cleaning operations involve a shut-down of operations and require the use of solvents, which, apart from being questionable in terms of occupational hygiene, also require costly disposal. The proposals of these two references have not met with industrial acceptance, particularly since the stated proposals could achieve only a low recycling rate, i.e. only a small proportion of recycled ground material could be used in the finished part.

The object of the present invention was, on the one hand, to allow the highest possible recycling rate in the finished part and, on the other, to prevent the formation of polymer in the mixing and conveying units so that operations need not be shut down for costly cleaning operations.

DESCRIPTION OF THE INVENTION

Figure 1:
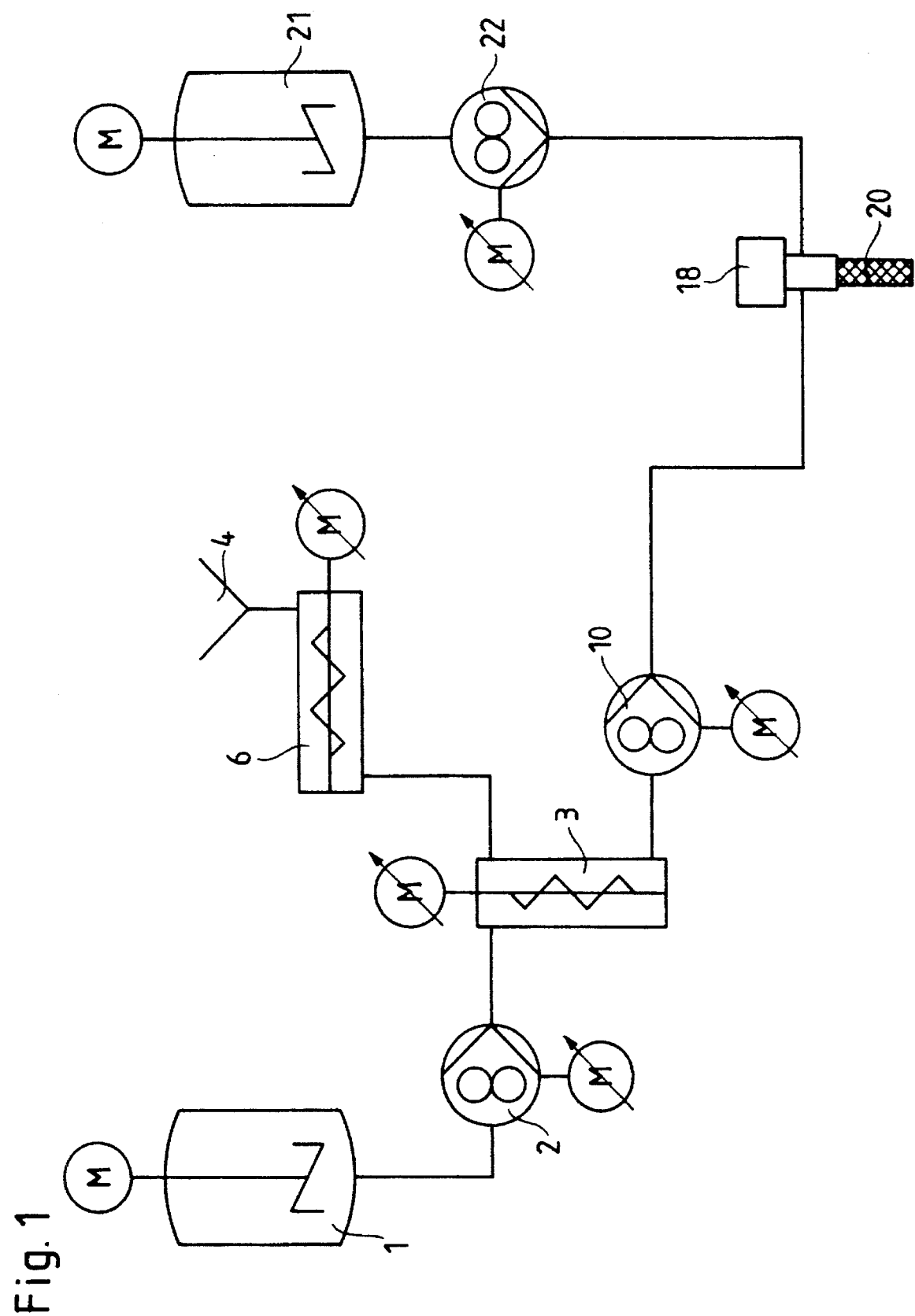
FIG. 1 shows a first device according to the invention, which is suitable for a continuous casting processes.

The basic principle of the invention is initially to incorporate the ground material or filler into only one of the reactive components of the reactive mixture, since the incorporation of fillers usually must be performed using difficult-to-clean dynamic mixing units, and in a second stage to add the second reactive component of the reactive mixture into the component into which the fillers have been incorporated, wherein mixing units which are as easy as possible to clean or are self-cleaning or are easily replaced mixing units are used for this further mixing operation.

In order to ensure a free-flowing viscosity at high ground material/filler contents, the first reactive component thus must be selected such that it is present in a considerable excess relative to the quantity of the second reactive component. Thus, the first reactive component used according to the invention is a pre-adduct of the reactive components. This pre-adduct is most preferably an isocyanate terminated prepolymer, i.e. a reaction product of an aromatic di- or polyisocyanate with a quantity of a di- and/or polyol insufficient to react with all the NCO groups.

The highly effective mixing technologies established in polyurethane technology, such as high pressure countercurrent injection and low pressure technology (see Kunststoff handbuch, volume 7, 1993, pages 144 and 145), are not useful for the further mixing of the highly viscous, pasty prepolymer/ground material mixtures (which may have viscosities of up to 150,000 mPa·s).

It has, however, surprisingly been found that using simple static mixers still results in sufficiently homogeneous mixing of the reactive component premixed with the ground material/filler with the other reactive component. Such static mixers are known in the art (see, e.g., *Chemical Engineers Handbook*, Perry, 1973, page 19–22). One commercially available static mixer is sold under the name Static Mixer, from Kenics Corporation. These may be used as a disposable static mixer made from plastic and require no cleaning as they may simply be replaced in the event of polymer formation, i.e. when the mixing element becomes clogged. Such disposable static mixers made from plastic with polyoxymethylene (POM) mixing elements and polypropylene (PP) housings are available from the company Statomix through the company Keller-Prozeβtechnik, Rot-Kreuz (Switzerland).

The present invention is accordingly directed to a process for the production of moldings (which may be cellular) comprising:

1) mixing and reacting an aromatic di- or polyisocyanate with a di and/or polyol of a molecular weight of 1,000 to 20,000 in a quantity insufficient to react with all the NCO groups to yield an isocyanate pre-adduct having an NCO group content of 5 to 32%,
2) mixing said pre-adduct with a ground material and/or filler,
3) mixing the mixture of step 2), with a di- and/or polyol of a molecular weight of 62 to 2,000 (crosslinking agent), which optionally contains water and/or organic blowing agents, in a static mixer, and
4) introducing the mixture of step 3) into a mold.

The components in stage 3 are apportioned such that the isocyanate index is from 70 to 800.

The preferred process comprises:

1) mixing and reacting an aromatic di- or polyisocyanate with a di and/or polyol of a molecular weight of 1,000 to 20,000 in a quantity insufficient to react with all the NCO groups to yield an isocyanate pre-adduct having an NCO group content of 5 to 32%,
2) mixing said pre-adduct with a ground material and/or filler, wherein the ground material/filler is present in an amount of from 5 to 95% by weight of the mixture of step 2),
3) mixing the mixture of step 2), with a di- and/or polyol of a molecular weight of 62 to 2,000, in a static mixer in an amount such that the isocyanate index is from 100 to 350, and
4) introducing the mixture of step 3) into a mold.

The starting materials useful in the present invention are known in the art.

Aromatic polyisocyanates, as are, for example, described by W. Siefken in Justus Liebigs Annalen der Chemie, 562, pages 75 to 136, and include, for example, those of the formula

wherein n represents a number of from 2 to 4 (and is preferably 2), and

Q represents an aromatic hydrocarbon residue with 6 to 15, preferably 6 to 13 carbon atoms.

It is particularly preferred to use commercially available polyisocyanates, such as, for example, 2,4- and 2,6-tolylene diisocyanate and mixtures of such isomers ("TDI"); polyphenylpolymethylene polyisocyanates, as are produced by aniline-formaldehyde condensation and subsequent phosgenation ("crude MDI"); and aromatic polyisocyanates containing carbodiimide groups, urethane groups, allophanate groups, isocyanurate groups, urea groups or biuret groups ("modified polyisocyanates"), in particular modified polyisocyanates derived from 2,4- and 2,6-tolylene diisocyanate or from 4,4'- and/or 2,4'-diphenylmethane diisocyanate.

Other starting components for use herein are compounds with at least two hydroxyl groups and having molecular weights of 62 to 20,000. Preferred hydroxyl group containing compounds having molecular weights of from 1,000 to 20,000 include polyethers, polyesters, polycarbonates, polylactones and polyamides, in particular compounds having 2 to 8, and preferably 2 to 4, hydroxyl groups. Such polyols are known for the production of homogeneous and cellular polyurethanes and are, for example, described on pages 11 to 18 in German Offenlegungsschrift 2,832,253. Mixtures of such compounds may also be considered according to the invention.

The crosslinking components used in step 3) are known in the art. These compounds contain at least two hydroxyl groups and have molecular weights of 62 to 2,000. These compounds generally have 2 to 8, preferably 2 to 4, hydroxyl groups. Examples of these compounds are described in German Offenlegungsschrift 2,832,253, pages 19 to 20.

Known auxiliary substances and additives may also be used. These include emulsifiers, reaction inhibitors, stabilizers, flame retardant substances, plasticizers, dyes and fungistatic and bacteriostatic agents. Details relating to the use and mode of action of such additives may be found in Kunststoff Handbuch, volume VII, edited by Vieweg and H öchtlen, Carl-Hanser Verlag, Munich, 1966, for example on pages 103–113.

Solid, fully reacted, pulverulent comminuted homogeneous and/or foamed polyurethane, polyurethane urea and/or polyurea plastics, which may optionally contain fillers and/or reinforcing agents, or composite materials such as dashboards or cable scrap may be used as the ground material. Such plastics are known and arise in many industrial processes, such as for example in the production of automotive accessories, foam mattress or furniture articles, and foam backed films.

Further solid organic and/or inorganic and/or natural high molecular weight substances may be used as fillers. These substances may be added as a pure new component, but may also be used as a composite after grinding without prior separation into the constituent materials. Typical examples of such composites are car dashboards, control panels, polyurethane foam-backed films in general, woven fabric, textiles, knitted fabric, braids and the like. Other examples of useful fillers include organic polymers such as thermoplastic polyurethanes, ABS and other diene co- and terpolymers, ABS/PVC blends, PVC and the like; natural organic products such as wood, cotton, straw and the like; as well as inorganic spherical, lameliar or fibrous materials, such as, for example, glass fiber, glass flakes and mica.

The grain size of the ground material/filler should be 0.01 to 10 mm, in a preferred embodiment 0.1 to 9 mm, in a particularly preferred embodiment 0.2 to 5 mm and in the most preferred embodiment 0.2 to 2 mm.

Organic blowing agents which may be used include low molecular weight aliphatic hydrocarbons with one to 6 carbon atoms, together with the partially or completely fluorinated and/or chlorinated representatives thereof. The blowing agents may be premixed either with the prepolymer or with the crosslinking agent.

Customary commercial mixing machines may be used to produce the prepolymer and to incorporate the ground material/filler, such as for example mixing screws, toothed stirrers, propeller stirrers, helical ribbon stirrers, kneaders and the like. In principle, the prepolymer may simultaneously be produced and blended with the ground material/filler in a single mixing unit. The ground material/filler is preferably incorporated separately in a mixing screw.

The homogeneous mixture of the isocyanate pre-adduct and the ground material/filler generally constitutes a highly viscous or pasty preparation. Machines which may be considered for conveying and metering are, for example, reciprocating pumps, gear pumps, rotary piston pumps, eccentric screw pumps, membrane pumps, peristaltic pumps or other conveying devices for highly viscous media generally known to the person skilled in the art. Further mixing with the additional crosslinking component and discharge into a suitable mold is performed according to the invention with a static mixer. Suitable static mixers include, for example, Sulzer, Kenics mixers or other mixers which operate on the "divide, turn, combine" principle and are generally known to the person skilled in the art.

The high recycling rates which may be achieved are, in particular, advantageous. The new molding may thus in principle contain up to 95% of comminuted material. Depending upon the requirements placed upon the products to be produced (mechanical properties), technically feasible loading levels are 40 to 60 wt. %.

The reactive mixture produced according to the invention is suitable both for continuous production of polyurethane elastomers by casting, continuous production of slab foam, continuous production of optionally laminated sheet goods and the intermittent production of foamed or homogeneous molded articles.

In the event that cellular moldings are to be produced, foaming may also be performed according to the invention in closed molds. Mold materials which may be considered are metal, for example aluminum, or plastic, for example epoxy resin. The foamable reaction mixture foams in the mold and forms the molding. In-mold foaming may here be performed in such a manner that the molding has a cellular structure on its surface. It may, however, also be performed in such a manner that the molding has a compact skin and a cellular core. It is also possible according to the invention to proceed in this connection in such a manner that the quantity of foamable reaction mixture introduced into the mold is such that the resultant foam exactly fills the mold. It is, however, also possible to introduce more foamable reaction mixture into the mold than is required to fill the mold cavity with foam. In this latter case, "overcharging" is used; such a method is, for example, described in U.S. Pat. Nos. 3,178,490 and 3,182,104.

Cellular profiles may, however, also optionally be cast from the reaction mixture.

The products of the present invention may be used in various applications, such as for example 2- and/or 3-dimensional moldings, such as for example in the automotive sector as laminable trim components or covers, internal door trims, control panel supports, dashboard supports, ventilation ducts, cable covers and ducting, boot liners and other applications. Non-automotive applications which may be considered are casings and casing covers, pallets, supports bearing low loads and covers.

During the further development of the process according to the invention, it was discovered, in particular when intermittently producing of moldings in which a mold is in each instance filled from the static mixer and the flow of reactive mixture is then interrupted, that a constant ground material/filler content cannot usually be achieved with intermittent production of a prepolymer-ground material/filler mixture. Intermittent operation of the mixer unit for mixing the prepolymer with the ground material/filler leads to variation in the ground material/filler content at the beginning and end of each operating phase ("shot"). Moreover, variations in pressure occur at the mixing head inlet of the static mixer, in particular at the beginning of each shot, such that the metered quantities of the two reactive components vary giving rise to variation in the mechanical properties of the molding due to variations in the isocyanate index. It is thus also proposed according to the invention to operate the mixer unit for mixing the prepolymer and ground material/filler continuously and to provide a storage piston between the continuously operated mixer unit and the intermittently operated static mixer, into which storage piston the mixture is conveyed from the mixer unit by a conveying unit, and in which a constant internal pressure is maintained hydraulically.

The present invention thus also provides a device for the production of moldings from two-component reactive systems with an elevated filler content, which device comprises a continuously operated mixer unit for mixing a reactive system pre-adduct with the filler, a conveying unit for conveying the mixture into a storage piston, wherein the mixture in the storage piston is maintained under a constant pressure, and an intermittently operated static mixer in which the preadduct/filler mixture is mixed with a crosslinking component.

Further details of the process according to the invention and the device according to the invention may be found in the attached figures. The schematic diagram of FIG. 1 shows mixing screw 3, into which the prepolymer is metered from container 1 by means of metering pump 2 and the ground material from hopper 4 by means of metering screw 6. The prepolymer/ground material mixture leaving mixing screw 3 is conveyed to mixing head 19 by means of pump 10. The crosslinking agent is conveyed from storage tank 21 to mixing head 19 by means of metering pump 22, which is electronically coupled with metering pump 2. When the mixing head valves are opened, the mixture is pressed through the static mixer 20 and mixed therein.

Figure 2:
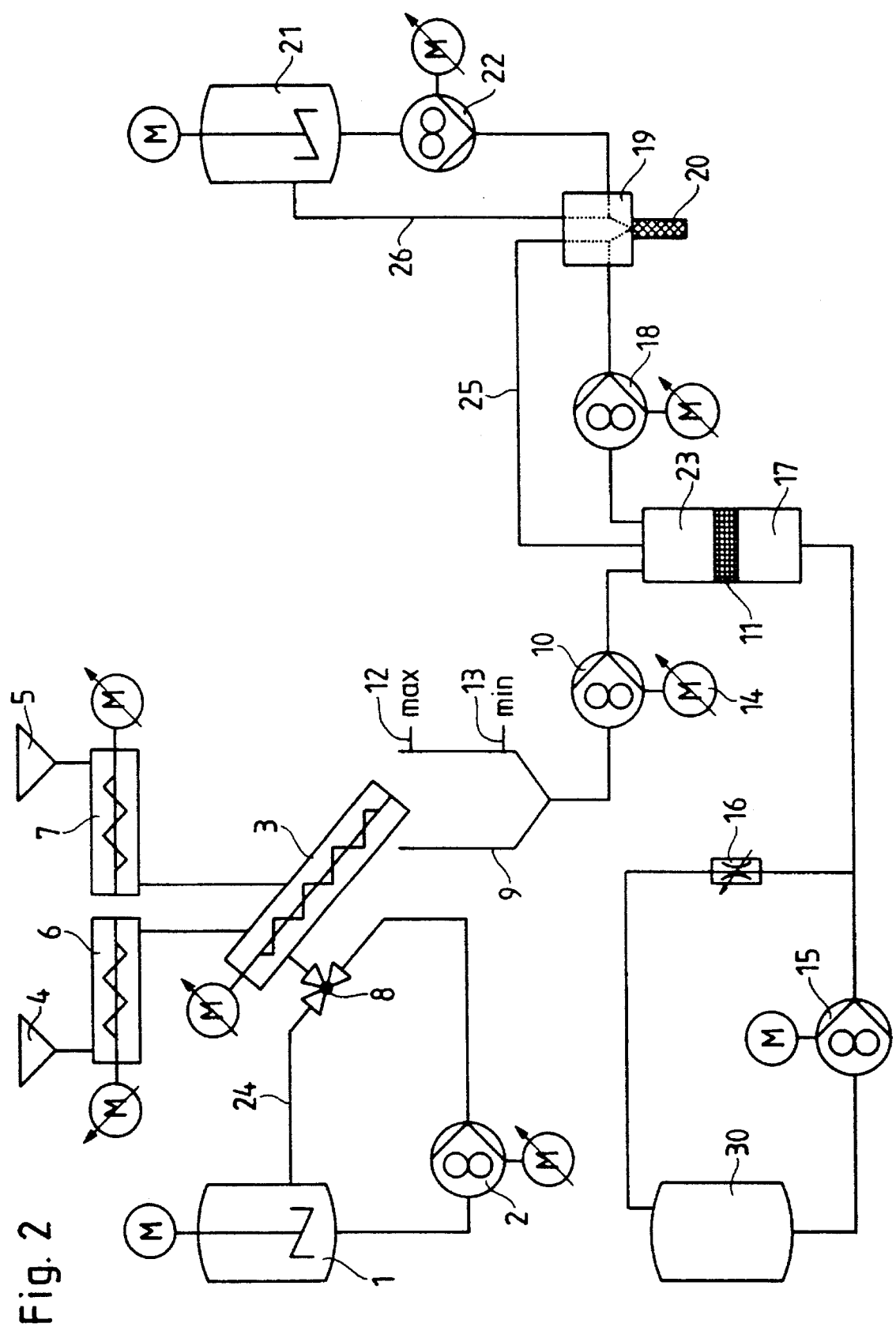
FIG. 2 shows a preferred device according to the invention for an intermittent shaping process with a continuously operated mixing screw.

FIG. 2 shows a device according to the invention with a storage piston 11 and recirculation of the reactive components. Otherwise, the same reference numbers denote the same elements as in FIG. 1. The prepolymer is conveyed from container 1 via valve 8 into mixing screw 3 by means of metering pump 2. If operation is suspended, the feed to mixing screw 3 via valve 8 is stopped and the prepolymer returned to container 1 via return line 24. Ground material is conveyed from hopper 4 via metering screw 6 to the mixing screw. A filler may additionally be fed from hopper 5 by means of metering screw 7. The prepolymer-ground material/filler mixture is conveyed from mixing screw 3 into intake hopper 9 and from there via sludge pump 10 into storage piston 11. Intake hopper 9 is provided with minimax level sensors 12, 13, by means of which sludge pump 10 is controlled, such that intake hopper 9 neither overflows nor runs empty. The mixture is conveyed from primary side 23 of storage piston 11 by means of conveying pump 18 to mixing head 19. In the event of intermittent operation at the end of a shot (i.e. when the mixing head valve is closed), the mixture is returned to storage tank 23 via return lines 25. Hydraulic fluid is conveyed from container 30 into secondary side 17 of storage piston 11 by means of gear pump 15. A constant pressure is maintained on secondary side 17 by means of regulating valve 16. Crosslinking agent is conveyed from tank 21 via metering pump 22 to mixing head inlet 19. When the mixing head valve is closed, the crosslinking agent is returned to container 21 via return lines 26. The primary volume 23 of reciprocating pump 11 is calculated such that, in the event of intermittent operation of static mixer 20, the mixture continuously produced in mixing screw 3 between two shots may be accommodated. During a shot, primary side 23 is then again substantially emptied. The quantity of mixture continuously produced in mixer 3 thus corresponds to the time-averaged quantity of mixture discontinuously introduced into the static mixer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of moldings comprising:
   1) mixing and reacting an aromatic di- or polyisocyanate with a di- and/or polyol of a molecular weight of 1,000 to 20,000 in a quantity insufficient to react with all the NCO groups to yield an isocyanate pre-adduct having an NCO group content of 5 to 32%,
   2) mixing the pre-adduct with a ground material and/or filler, wherein the ground material and/or filler is present in an amount of from 5 to 95% by weight of the mixture of step 2),
   3) mixing the mixture of step 2) in astatic mixer with a di- and/or polyol of a molecular weight of 62 to 2,000 (crosslinking agent), which optionally contains water and/or organic blowing agents, and
   4) introducing the mixture of step 3) into a mold.

2. The process of claim 1, wherein the components in step 3) are apportioned such that the isocyanate index is from 70 to 800.

3. The process of claim 1, wherein the mixture of isocyanate pre-adduct and ground material/filler is produced continuously and the further mixing stage with the crosslinking agent proceeds intermittently for mold filling, wherein, before mixing with the crosslinking agent, the isocyanate pre-adduct-ground material/filler mixture is temporarily stored between two successive mold filling operations.

* * * * *